(12) United States Patent
Fukuoka et al.

(10) Patent No.: US 6,513,465 B2
(45) Date of Patent: Feb. 4, 2003

(54) TWO-STROKE INTERNAL COMBUSTION ENGINE

(75) Inventors: Takashi Fukuoka, Tokyo (JP); Mitsujiro Mochizuka, Tokyo (JP); Shiro Yamaguchi, Tokyo (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 09/847,578

(22) Filed: May 2, 2001

(65) Prior Publication Data
US 2002/0104493 A1 Aug. 8, 2002

(30) Foreign Application Priority Data
Feb. 5, 2001 (JP) ........................................ 2001-028876

(51) Int. Cl.⁷ ............................................... F02B 33/04
(52) U.S. Cl. .................. 123/73 PP; 123/73 A
(58) Field of Search ............................. 123/73 A, 73 C, 123/73 PP

(56) References Cited

U.S. PATENT DOCUMENTS

| | | | | |
|---|---|---|---|---|
| 2,190,011 A | * | 2/1940 | Boxan | 123/73 A |
| 4,185,598 A | * | 1/1980 | Onishi | 123/73 A |
| 4,445,468 A | * | 5/1984 | Onishi et al. | 123/73 C |
| 5,740,767 A | * | 4/1998 | Kaku et al. | |

FOREIGN PATENT DOCUMENTS

JP 179346 6/2000

\* cited by examiner

*Primary Examiner*—Noah P. Kamen
(74) *Attorney, Agent, or Firm*—Baker Botts LLP

(57) ABSTRACT

A two-stroke internal combustion engine that emits exhaust gases with reduced amounts of noxious components, such as HC, and has less blow-by of unburned air-fuel mixture has a crank chamber located below a piston and a combustion actuating chamber located above the piston. Either one pair or two pairs of scavenging passageways communicate the crank chamber with the combustion actuating chamber, the scavenging passageways of the one pair or of each of the two pairs being disposed symmetrically with respect to a plane that bisects an exhaust port so as to form a Schnürle-type scavenging system. Each scavenging passageway is throttled at a location proximate to a scavenging inlet port thereof.

14 Claims, 8 Drawing Sheets

(A)

(B)

(C)

TWO-STROKE INTERNAL COMBUSTION ENGINE

BACKGROUND OF THE INVENTION

The present invention relates to a two-stroke cycle internal combustion engine that is suited for use in, for example, a portable power working machine and, in particular, to a two-stroke cycle internal combustion engine that produces exhaust gases that are cleaner than the exhaust gases emitted by many previously known two-stroke cycle engines and in which blow-by of unburned air-fuel mixture is reduced.

Two-stroke cycle internal combustion engines of the type that are commonly used in portable power working machines, such as bush cutters and chain saws, include a cylinder head that forms with a piston a combustion actuating chamber and a crankcase forming a crank chamber. (Although the chamber formed in the cylinder may be called a combustion chamber, an actuating chamber, a cylinder chamber, etc., the chamber in the cylinder is generically referred to in the present specification as a combustion actuating chamber.) An intake port, a scavenging port and an exhaust port, that are opened and closed by the piston, are provided in the trunk portion of the cylinder. One cycle of the operation of the engine is accomplished by two strokes of the piston—there is no stroke assigned exclusively to either the intake of fuel/air or the exhaust of combustion gases, as in a four-stroke cycle engine.

During the ascending stroke of the piston, an air-fuel mixture is inducted from the intake port into the crank chamber below the piston. When the piston descends, the air-fuel mixture in the crank chamber is pre-compressed, producing a compressed gas mixture, which is conducted through a scavenging passage and then blown from the scavenging port into the working chamber above the piston so as to push the combustion waste gases toward the exhaust port—the flow of the compressed air/fuel mixture is thus utilized for "scavenging" the combustion waste gas. The unburned air-fuel mixture used for scavenging is likely to be mixed with the combustion gas (exhaust gas), thereby increasing the quantity of so-called "blow-by," the quantity of air-fuel mixture discharged without being utilized for combustion. Because of blow-by, two-stroke cycle internal combustion engines are not only inferior from the point of view of fuel consumption but also disadvantageous in that a larger amount of noxious components, such as HC (unburned components of the fuel) and CO (incompletely burned fuel) are present in the exhaust gas as compared with a four-stroke cycle engine. Therefore, even if the two-stroke cycle engine is of small displacement, the contribution of the noxious components to environmental contamination is significant. Additionally, conventional two-stroke cycle internal combustion engines are often not able to meet the increasingly severe exhaust gas emission regulations that are being established by governmental authorities, particularly with regard to the HC components (total HC) in the exhaust gases.

Generally, a mixed fuel consisting of gasoline and a lubricant oil is used in two-stroke cycle internal combustion engines. Therefore, the exhaust gas is also contaminated by the oil component of the fuel. Depending on the operating attitude (inclination) of the engine, moreover, an excessive amount of the oil component of the fuel may be introduced into the combustion actuating chamber, thereby causing problems in the operation of the engine.

BRIEF SUMMARY OF THE INVENTION

The present invention has been made to overcome the aforementioned problems. An object of the present invention is, accordingly, to provide a two-stroke cycle internal combustion engine that emits exhaust gases with lesser amounts of noxious components, such as HC, than contained in the exhaust gases emitted by many previously known two-stroke cycle engines and in which blow-by of unburned air-fuel mixture is reduced. It is also an object to attain such improvements without necessitating a considerable modification in the structure of the engine or a substantial increase in manufacturing cost. Yet another object is to reduce the instances of operational problems with two-stroke cycle engines.

To attain the aforementioned objects, a two-stroke cycle internal combustion engine, according to the present invention, has a crank chamber located below a piston and a combustion actuating chamber located above the piston. Either one pair or two pairs of scavenging passageways communicate the crank chamber with the combustion actuating chamber, the scavenging passageways of the one pair or of each of the two pairs being disposed symmetrically with respect to a plane that bisects an exhaust port so as to form a Schnürle-type scavenging system. Each scavenging passageway is throttled at a location proximate to a scavenging inlet port thereof.

In some embodiments of the present invention, the combustion actuating chamber may be defined by a cylinder member, the crank chamber is defined by a crankcase member connected to an underside of the cylinder member, and a plate-like member is interposed between the cylinder member and the crankcase member. The plate-like member has a throttling hole having an open area which is smaller than the cross-sectional area of the scavenging passageway at locations immediately adjacent the plate-like member so as to throttle a portion of each of the scavenging passageways which is located close to the scavenging inlet port.

In other embodiments of the internal combustion engine according to the present invention, a partition wall provided with a throttling hole having an opening area which is smaller than the cross-sectional area of the scavenging passageway is disposed close to the scavenging inlet port of each of the scavenging passageways.

In preferred embodiments of the internal combustion engine according to the present invention, the position and size of each throttling hole are selected in a manner such as to cause a turbulent flow in the scavenging gas flow through the scavenging passageway.

It is also advantageous for an internal combustion engine according to the present invention to include a step portion formed in a region close to the scavenging inlet port of each of the scavenging passageways due to the provision of the throttling hole.

In further preferred embodiments of the internal combustion engine according to the present invention, a scavenging outlet port of each of said pair or pairs of scavenging passageways is also throttled.

In the operation of two-stroke cycle internal combustion engines according to the present invention constructed as described above, as the pressure inside the crank chamber is reduced during the ascending stroke of the piston, an air-fuel mixture supplied from an air-fuel generating device, such as a carburetor, is inducted into and held in the crank chamber. When the air-fuel mixture inside the combustion actuating chamber disposed above the piston is ignited and burns, the piston is driven downwardly due to the generation of combustion gas. Upon the descending stroke of the piston, the air-fuel mixture held in the crank chamber and the scavenging passageways is compressed by the piston. Near the end of the descending stroke, the exhaust port opens first and when the piston has further descended, the scavenging outlet port provided at a downstream end of the scavenging passageway is opened. During the scavenging period where the scavenging outlet port is opened, the air-fuel mixture compressed in the crank chamber flows toward the downstream end of the scavenging passageway toward the combustion actuating chamber and is discharged out of the scavenging outlet port as a scavenging gas flow having a predetermined horizontal scavenging angle directed toward an inner wall portion of the cylinder bore which is located opposite to the exhaust port. The scavenging gas flow subsequently impinges against the aforementioned inner wall portion of the cylinder bore and then is turned back therefrom to thereby push the combustion waste gases out of the exhaust port.

The throttling hole provided in the vicinity of the scavenging inlet port of each of the scavenging passageways causes a relatively large difference in pressure to be generated between the crank chamber and the downstream side of the throttling hole of each of the scavenging passageways, as compared with the case where the throttling hole is not provided, thereby causing the air-fuel mixture to be ejected as a high-velocity jet from the throttling hole and to flow downstream therefrom. Thus, the provision of the throttling hole makes it possible to enhance the pressure and flow rate of the scavenging gas as compared with the case where a portion in the vicinity of the scavenging inlet port of the scavenging passageway is not throttled. The scavenging gas that has passed through the throttling hole then expands abruptly, thus generating a turbulent state of flow in the gas as it flows through the scavenging passageway and is thereafter blown out from the scavenging outlet port into the combustion actuating chamber. If the scavenging outlet port is also throttled, the flow rate of the gas flow from the outlet port into the combustion actuating chamber is further enhanced.

Accordingly, the atomization of fuel can be promoted, the scavenging efficiency (trapping efficiency) can be improved, and at the same time, the combustion efficiency can be improved. As a result, it becomes possible to obtain a predetermined power with a smaller quantity of fuel, and to effectively minimize the noxious components in the exhaust gas, in particular the total HC, and additionally, the fuel consumption can be improved.

A throttling hole having an open area which is smaller than the cross-sectional area of the scavenging passageway may be formed in a gasket-form of a plate-like member, which is designed to be interposed at the juncture between the cylinder member and the crankcase member so as to throttle a portion of each of the scavenging passageways which is located close to the scavenging inlet port thereof. In such a structure, a separate member is not needed to provide the throttling of the gas. Moreover, it is not necessary to modify the cylinder member or the crankcase member, thus making the present invention very advantageous in terms of manufacturing cost.

Although a mixed fuel comprising a fuel (gasoline) and a lubricant oil is generally employed in the two-stroke cycle internal combustion engine, due to a centrifugal separating effect by the rotation of the engine, in particular, a high speed rotation thereof, a greater portion of the fuel/lubricant oil mixture existing in an air/fuel mixture that has been introduced into the crank chamber is separated from the air and permitted to adhere to the inner wall of the crank chamber. Since the throttled portion (the throttling hole portion) located in the vicinity of the scavenging inlet port of the scavenging passageway constitutes a step portion, most of the fuel which is low in viscosity is allowed to flow into the scavenging passageway together with air, but most of the lubricant oil is caused to remain in the crank chamber due to the blocking effect of the step portion. Therefore, even if the rate of the supply of a fuel/air/lubricant mixture to the engine is reduced, it is possible to secure a sufficient quantity of lubricant oil which is required for lubricating the sliding portions such as the piston, the connecting rod, and the crankshaft, and to avoid a deterioration in the lubricating performance of the engine.

When the attitude of an engine is caused to change (for example, when a chain saw is tilted upwardly) during the idling of the engine, the fuel/lubricating oil mixture which remains inside the crank chamber is permitted to flow excessively into the combustion actuating chamber via the scavenging passageways if the aforementioned step portion is not provided, thereby causing the engine to function poorly and even stop. When the aforementioned step portion is provided as described above, the fuel/lubricating oil mixture which is contained in the crank chamber is impeded from flowing into the scavenging passageways, thereby making it possible to avoid many instances of poor operation of the engine.

DETAILED DESCRIPTION OF THE INVENTION

Figure 1:
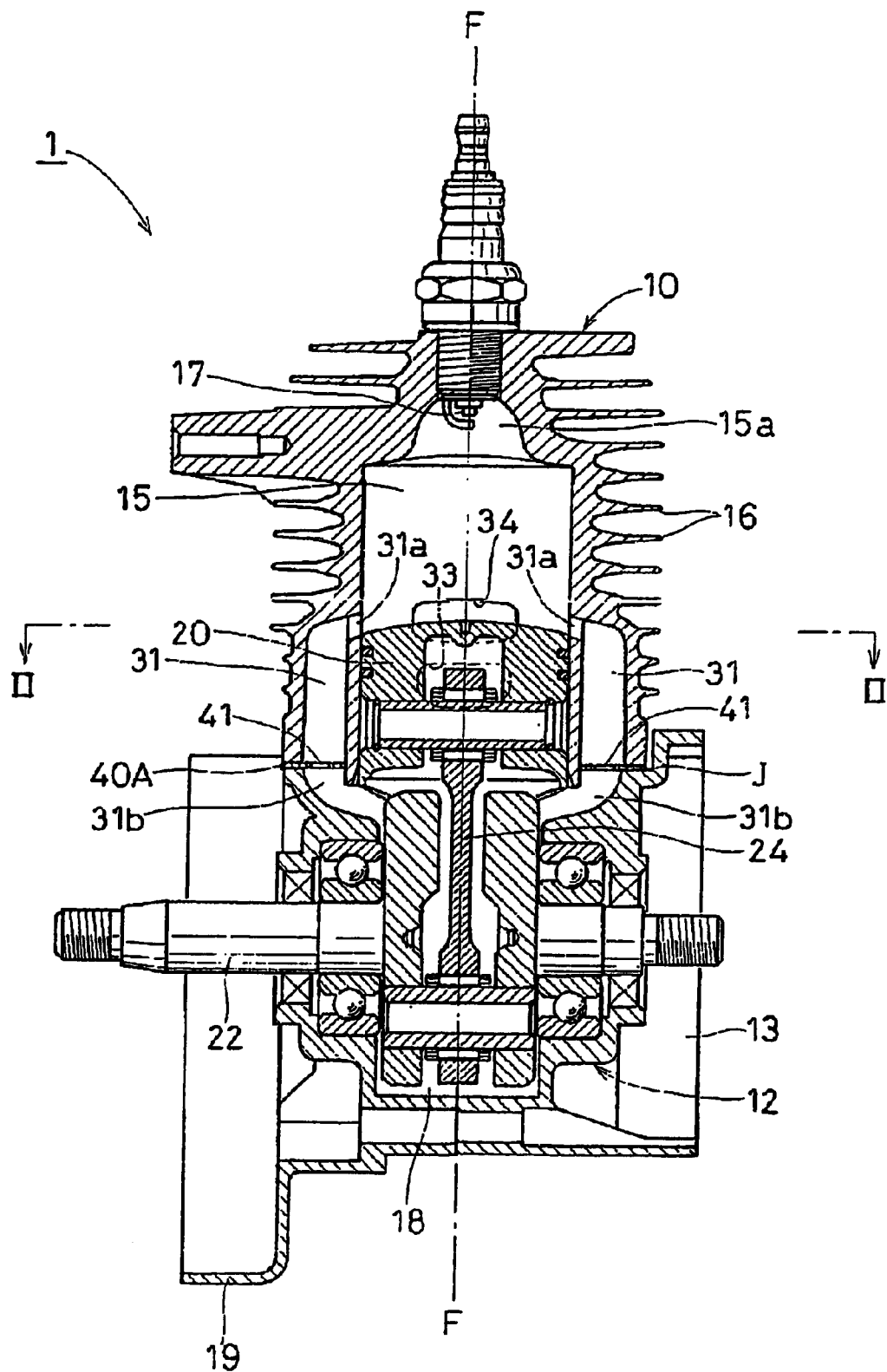
FIG. 1 is a longitudinal sectional view illustrating a first embodiment of the two-stroke cycle internal combustion engine according to the present invention.
Figure 2:
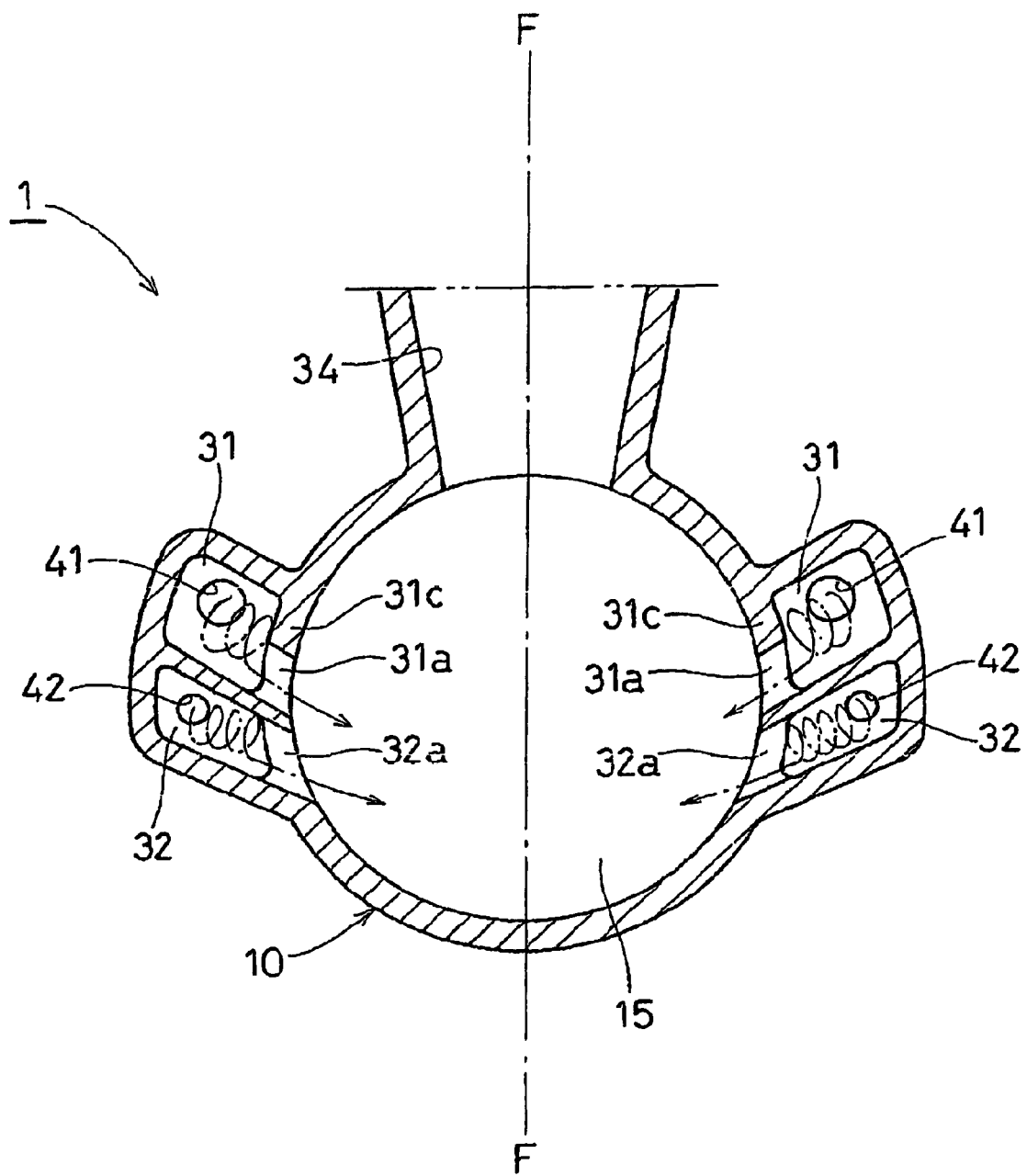
FIG. 2 is a cross-sectional view taken along the line II—II in FIG. 1.

The two-stroke cycle internal combustion engine 1 according to the first embodiment, as shown in FIGS. 1 and 2, is a small air-cooled two-stroke cycle gasoline internal combustion engine having a quaternary scavenging system, which is well-suited for use in a portable working machine. The engine 1 has a cylinder 10 that receives a piston 20 and a crankcase 12 of a split, two-piece construction, which is firmly fastened via a gasket 40A (to be explained hereinafter) to the underside of the cylinder 10 by mean s of f our through-bolts (not shown) which are respectively inserted through four corner portions of the members. The crankcase 12 defines a crank chamber 18 below the cylinder 10, and a crankshaft 22 for reciprocatively moving a piston 20 up and down through a connecting rod 24 is rotatably supported by the crankcase 12.

To the right and left sides of the crankcase 12 are integrally attached the base portion 13 of a recoil starter case and the base portion 19 of a fan case, respectively.

The cylinder 10 is provided, on the outer circumferential wall thereof, with a plurality of cooling fins 16, and, at the head portion thereof, with a squish-dome shape (semi-spherical) combustion chamber 15a constituting the combustion actuating chamber 15. An ignition plug 17 is threaded into a hole at the top of the cylinder head portion.

The trunk portion of the cylinder 10 is provided on one side thereof with an exhaust port 34 and on the other side thereof with an inlet port 33, which is positioned at a lower level (i.e., positioned closer to the crank chamber 18) than that of the exhaust port 34. A pair of first scavenging passages 31 are disposed close to the exhaust port 34 and symmetrically on both sides of a longitudinal plane F—F that bisects the exhaust port 34, thereby constituting a Schnürle-type scavenging system. Further, another pair of second scavenging passages 32 are disposed away from the exhaust port 34 and symmetrically on both sides of the aforementioned longitudinal plane F—F, thereby also constituting a Schnürle-type scavenging system. The first and second scavenging passages 31 and 32 both extend from the cylinder 10 to the crankcase 12.

Figure 5:
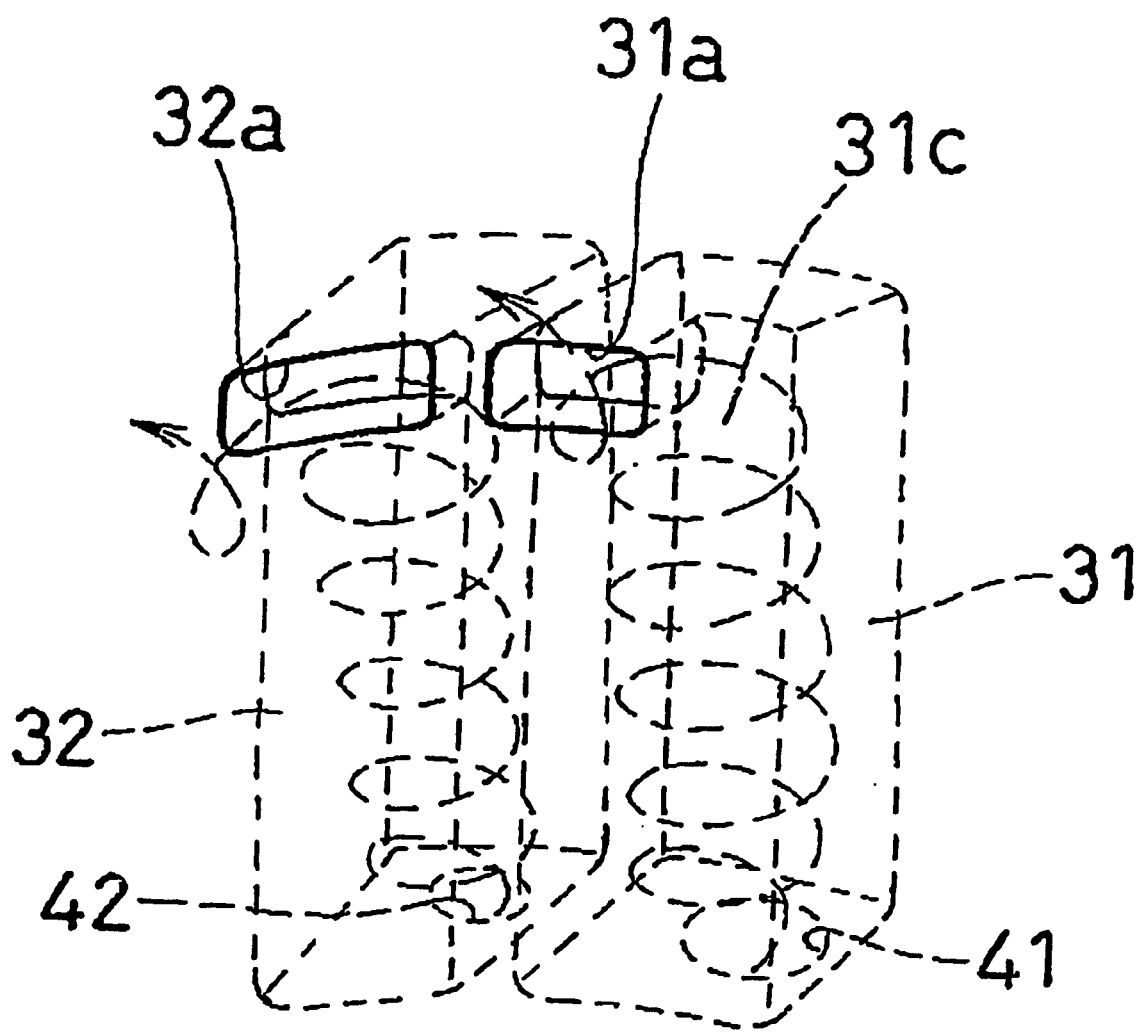
FIG. 5 is a schematic view illustrating the relationship between the scavenging passageway and the scavenging gas flow in the engine shown in FIG. 1.

As clearly shown in FIGS. 2 and 5, at an upper end (downstream end) of the first scavenging passages 31, a pair of first scavenging outlet ports 31a open to the combustion actuating chamber 15 at a predetermined horizontal scavenging angle. Likewise, a pair of second scavenging outlet ports 32a open to the combustion actuating chamber 15 at a predetermined horizontal scavenging angle at an upper end (downstream end) of the second scavenging passages 32. Each of the first scavenging outlet ports 31a is provided on the exhaust port 34 sides thereof with a throttling wall 31c that considerably reduces the open area of the scavenging passageway at the port opening as compared with the cross-sectional area on the immediately upstream side of the throttling wall 31c. Likewise, the second scavenging outlet ports 32a are also slightly throttled as compared with the second scavenging passages 32 located on the immediately upstream side of the second scavenging outlet ports 32a.

In the embodiment, the elevational height of the first scavenging outlet ports 31a is the same as that of the second scavenging outlet ports 32a, and the elevational height of the uppermost end of the scavenging outlet ports 31a and 32a is lower than the uppermost end of the exhaust port 34 by a predetermined distance. Therefore, when the piston 20 descends, the two pairs of the scavenging outlet ports 31a and 32a open concurrently a short time after the exhaust port 34 opens.

The scavenging inlet ports 31b and 32b disposed at the lower ends (upstream ends) of the first and second scavenging passageways 31 and 32 are located on the crank chamber 18 side (the crankcase side), so that the gasket 40A interposed at the mating face J between the cylinder 10 and the crankcase 12 is capable of functioning as a barrier wall which seals the portions of the first and second scavenging passageways 31 and 32 which are located relatively close to the scavenging inlet ports 31b and 32b, respectively.

Referring to FIG. 4(A), the gasket 40A is well known as far as the base material thereof is concerned and is of a rectangular configuration. It retains its shape so that it resists deformation by the flow of air-fuel mixture. Additionally, the gasket 40A is provided at the central portion thereof with a circular hole 48 corresponding to the outer diameter of the base portion of the cylinder bore, and at the four corner portions thereof with a hole 49 for permitting a fastening through-bolt to pass therethrough. Furthermore, the gasket 40A is provided, at the portions which correspond to the first and second scavenging passageways 31 and 32, with circular throttling holes 41 and 42, each having a smaller sectional area than that of the cross-sectional area of the first and second scavenging passageways 31 and 32 (to be explained hereinafter) so as to throttle the portions of the first and second scavenging passageways 31 and 32 which are located close to the scavenging inlet ports 31b and 32b thereof.

Figure 3:
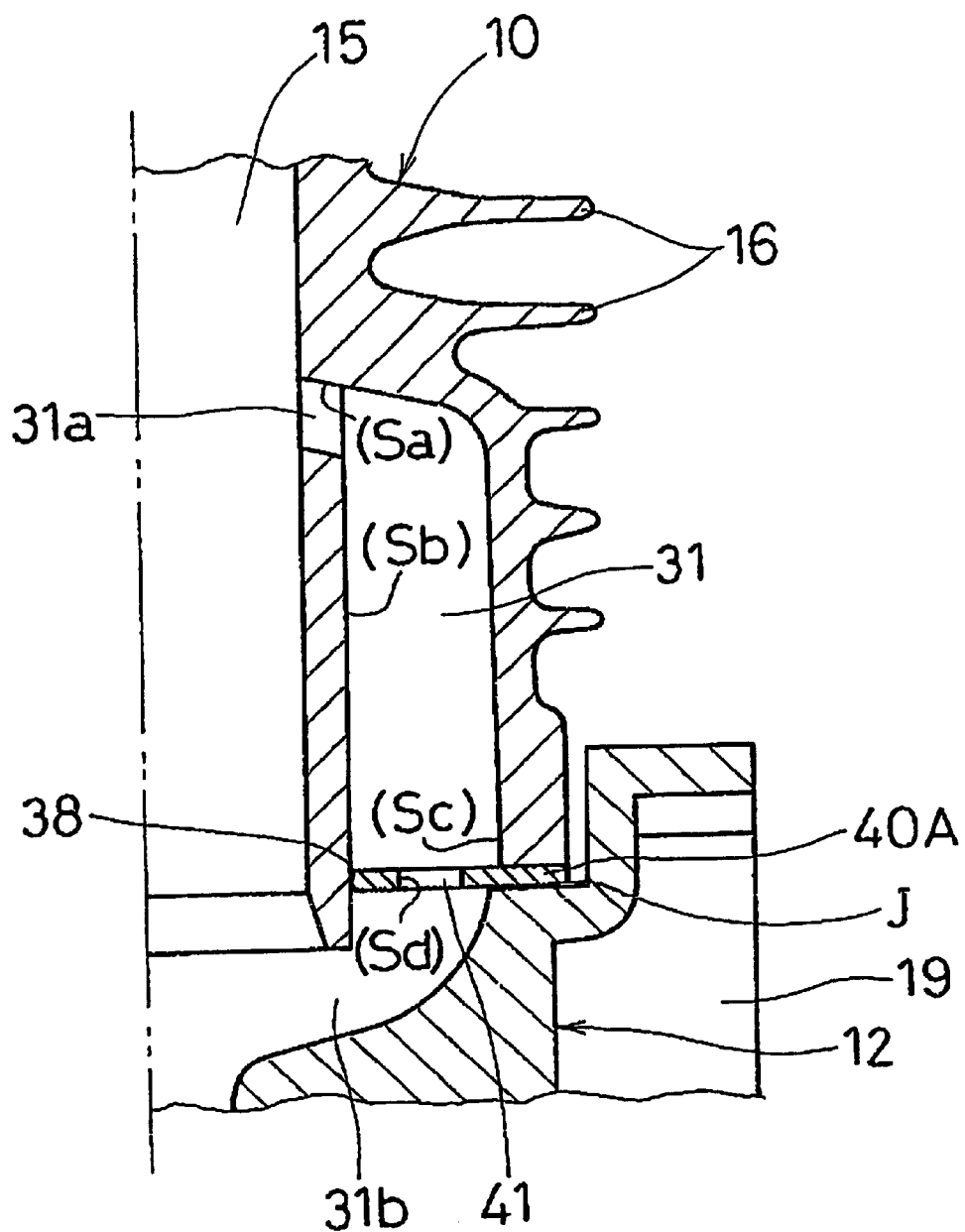
FIG. 3 is an enlarged cross-sectional view of the scavenging passageway of the engine shown in FIG. 1.
Figure 4:
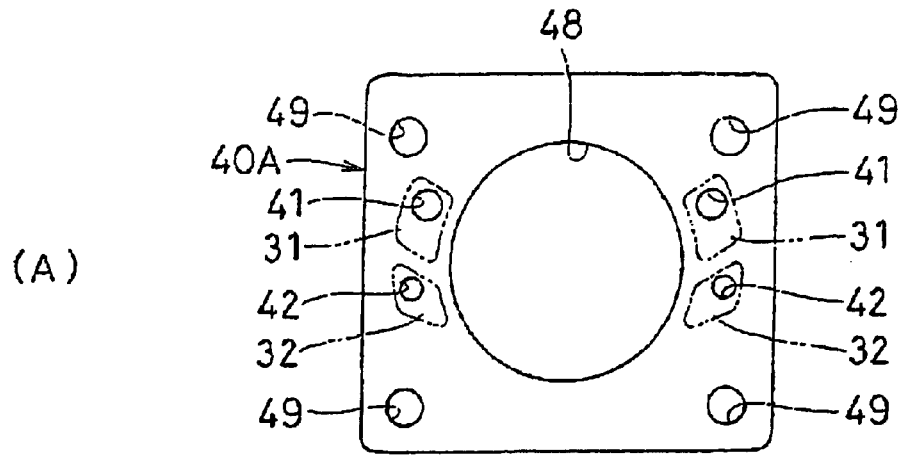
FIGS. 4A to 4C show various examples of a gasket suitable for the engine shown in FIG. 1.
Figure 4:
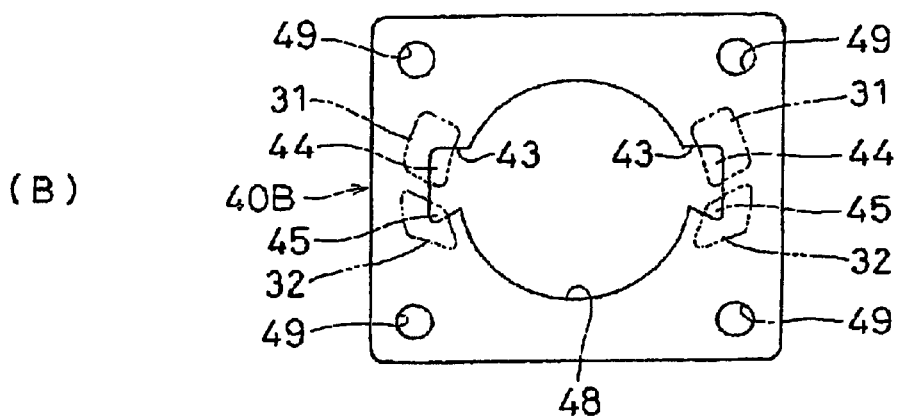
Figure 4:
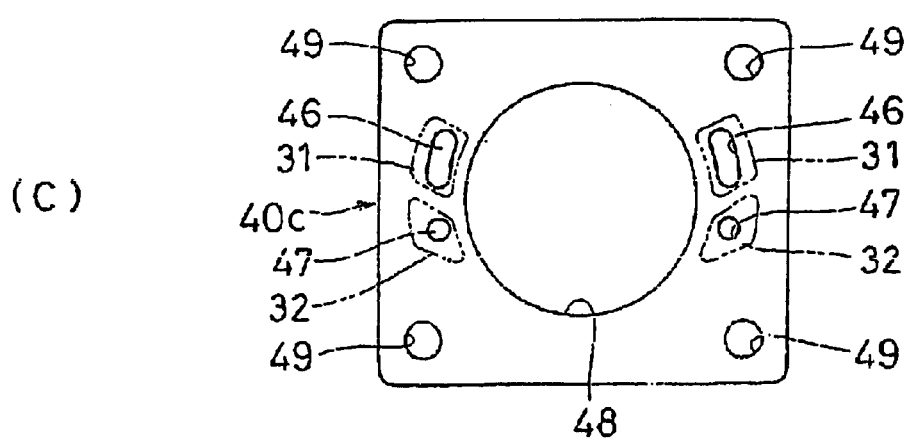

The positions and sizes of the throttling holes 41 and 42 are selected such that the center in cross section of each of the scavenging passageways is suitably off-set so as to permit a swirl-like turbulent flow to be produced in the scavenging gas flow, as shown in FIG. 4. In FIG. 3, which is an enlarged view of the first scavenging passageway 31, the cross-sectional area of the scavenging outlet ports 31a and 32a in the first and second scavenging passageways 31 and 32 is represented by Sa; the cross-sectional area of an intermediate portion of each of the first and second scavenging passageways 31 and 32 which is located on the upstream side (lower side) of the scavenging outlet ports 31a and 32a is represented by Sb; the cross-sectional area of each of the first and second scavenging passageways 31 and 32 which is located on immediately the downstream side (upper side) of the throttling holes 41 and 42 is represented by Sc; and the opening area of each of the throttling holes 41 and 42 is represented by Sd. The areas are selected so as to meet the relationships of: Sd#Sa<Sb<Sc. Specifically, in the case of a two-stroke cycle internal combustion engine having a displacement of about 20 to 60 mL for instance, if the cross-sectional area Sc of each of the first and second scavenging passageways 31 and 32 which is located on immediately the downstream side of the throttling holes 41 and 42 is assumed as being 100, the opening area Sd of each of the throttling holes 41 and 42 should preferably be in the range of 50 to 55 mm², the cross-sectional area Sb of the passageway of intermediate portion should preferably be in the range of 75 to 80 mm²₁ and the cross-sectional area Sa of the scavenging outlet ports 31a and 32a should preferably be in the range of 60 to 70 mm².

In the operation of the two-stroke cycle internal combustion engine 1 of the first embodiment which is constructed as described above, as the pressure inside the crank chamber 18 is gradually reduced during the ascending stroke of the piston 20, the air-fuel mixture introduced from the air-fuel mixture-generating device, such as a carburetor (not shown), is drawn in from the intake port 33 into the crank chamber 18 and held therein.

When the air-fuel mixture inside the combustion actuating chamber 15 disposed above the piston 20 is ignited and burned, the piston 20 is pushed down due to the generation of a combustion gas. During the descending stroke of the piston 20, the air-fuel mixture held inside the crank chamber 18 and the scavenging passageways 31 and 32 is compressed by the piston 20. When the piston is near bottom dead center, the exhaust port 34 opens. After the piston 20 descends a little farther, the scavenging outlet ports 31a and 32a located at the downstream end of the scavenging passageways 31 and 32 are opened concurrently. During the scavenging period when the scavenging outlet ports 31a and 32a are open, the air-fuel mixture compressed inside the crank chamber 18 is ejected, via the throttling holes 41 and 42 disposed in the vicinity of the scavenging inlet ports 31b and 32b, toward the downstream side of the scavenging passageways 31 and 32. At the same time, the air-fuel mixture is sucked toward the combustion actuating chamber 15 so as to be blown out of the scavenging outlet ports 31a and 32a as a scavenging gas flow having a predetermined horizontal scavenging angle and directed toward an inner wall portion of the cylinder bore which is located opposite to the exhaust port 34. The scavenging gas flow impinging against the aforementioned inner wall portion of the cylinder bore is then turned back therefrom to thereby push the combustion waste gas out of the exhaust port 34.

Inasmuch as the throttling holes 41 and 42 are provided in the vicinity of the scavenging inlet ports 31b and 32b of the scavenging passageways 31 and 32, a significant difference in pressure is generated between the crank chamber 18 and the downstream side of the throttling holes 41 and 42 of the scavenging passageways 31 and 32 as compared with the case where such throttling holes 41 and 42 are not provided, thereby enabling the air-fuel mixture to be ejected as a jet from the throttling holes 41 and 42 and to flow downstream therefrom. The throttling holes 41 and 42 enhance the pressure and flow rate of the scavenging gas, as compared with the case where a portion in the vicinity of each of the scavenging inlet ports 31b and 32b of the scavenging passageways 31 and 32 is not throttled, thereby causing the scavenging gas that has passed through the throttling holes 41 and 42 to expand abruptly, thus generating a swirl-like turbulent flow therein and to be blown out from the scavenging outlet ports 31a and 32a into the combustion actuating chamber 15 as shown in FIGS. 3 and 5. If the scavenging outlet ports 31a and 32a are also throttled, the flow rate of the gas flow can be further enhanced.

Accordingly, the atomization of fuel can be promoted, the scavenging efficiency (trapping efficiency) can be improved, and at the same time, the combustion efficiency can be improved. As a result, it becomes possible to obtain a predetermined power with a smaller quantity of fuel, and to effectively minimize the noxious components in the exhaust gas, in particular the total HC, and additionally, the fuel consumption can be improved.

Figure 8:
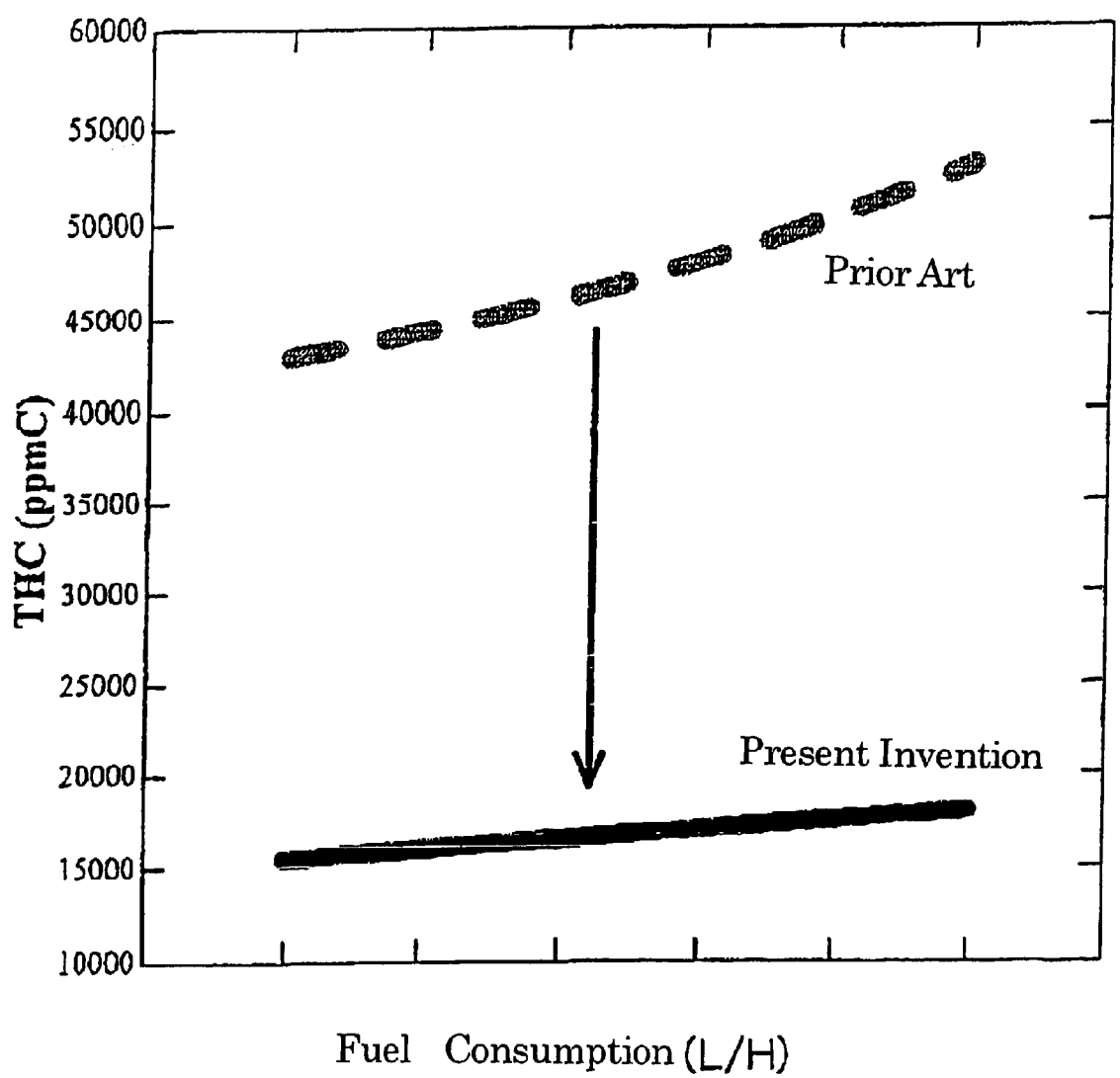
FIG. 8 is a graph illustrating the results of the comparison tests between an engine according to the present invention and an engine according to the prior art.

A comparison test was performed using a two-stroke cycle internal combustion engine 1 constructed according to the embodiment described above and having a displacement of 22.8 mL or a displacement of 25.4 mL (the present invention) and a conventional two-stroke cycle internal combustion engine of the same displacement as mentioned above and constructed in the same manner as the embodiment except that the scavenging passageways 31 and 32 were not throttled at all (prior art). Under the same test conditions, the results shown in FIG. 8 were obtained. The total HC (THC) discharged from the engine according to the present invention was confirmed as being reduced by 60% or more as compared with that of the prior art engine.

Since throttling holes 41 and 42, each having an open area which is smaller than any of the cross-sectional areas Sb and Sc of the scavenging passageways 31 and 32 are formed in the gasket 40A so as to throttle a portion of each of the scavenging passageways 31 and 32 which is located close to each of the scavenging inlet ports 31b and 32b thereof, a separate member is not needed to provide throttling. Moreover, the cylinder and crankcase do not have to be modified, thus making the present invention very advantageous in terms of manufacturing cost.

Additionally, although a mixed fuel comprising a fuel (gasoline) and a lubricant oil is generally employed in the two-stroke cycle internal combustion engine, due to a centrifugal separating effect by the rotation of the engine, in particular, a high speed rotation thereof, a greater portion of the fuel/lubricant oil mixture existing in an air/fuel mixture that has been introduced into the crank chamber 18 is separated from the air and permitted to adhere to the inner wall of the crank chamber 18. Also, inasmuch as each of the throttled portions (the throttling holes 41 and 42) located in the vicinity of the scavenging inlet ports 31b and 32b of the scavenging passageways 31 and 32 constitute a step portion, most of the fuel which is low in viscosity is allowed to flow into the scavenging passageways 31 and 32 together with air, but most of the lubricant oil is caused to remain in the crank chamber 18 due to the blocking effect of the step portion. Therefore, even if the supply flow rate of fuel (fuel/lubricant mixture) is reduced (lean supply of air/fuel mixture), it is possible to secure a sufficient quantity of lubricant oil which is required for lubricating the sliding portions such as the piston 20, the connecting rod 24, and the crankshaft 22 without causing the lubricating performance of the internal combustion engine to be degraded.

Further, when the attitude of an internal combustion engine 1 changes, as commonly occurs in the use of a portable working machine (for example, when the chain of a chain saw is tilted upwardly) during the idling of the engine for instance, the fuel/lubricating oil mixture inside the crank chamber 18 is sometimes permitted to flow excessively into the combustion actuating chamber 15 via the scavenging passageways 31 and 32 if the aforementioned step portion is not provided, thereby causing poor operation or even stalling of the engine. Whereas, when the aforementioned step portion is provided as described above, the fuel/lubricating oil mixture inside the crank chamber 18 is impeded from flowing into the scavenging passageways 31 and 32, thereby making it possible to reduce operating problems.

The throttling holes 41 and 42 can be formed in the gasket 40A by making a pair of right and left cut-out portions 43 formed so as to partially overlap with the scavenging passageways 31 and 32, thereby forming throttling holes 44 and 45 as in the case of the gasket 40B shown in FIG. 4(B). Alternatively, as in the case of the gasket 40C shown in FIG. 4(C), a pair of right and left throttling holes 46 formed in association with the first scavenging passageways 31 may be of a larger area than that of the throttling holes 47 of the second scavenging passageways 32.

Figure 6:
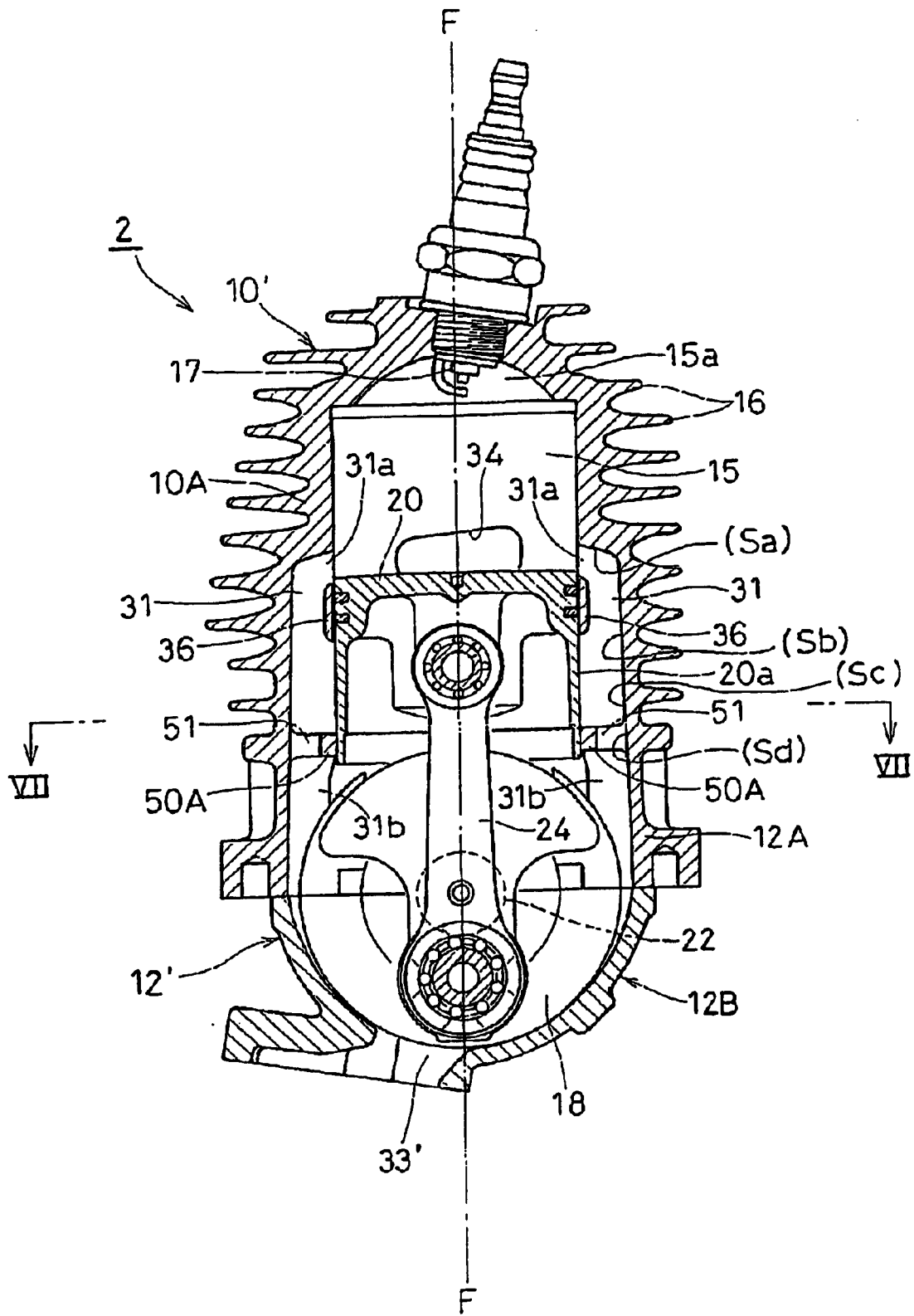
FIG. 6 is a longitudinal sectional view illustrating a second embodiment of the two-stroke cycle internal combustion engine according to the present invention.
Figure 7:
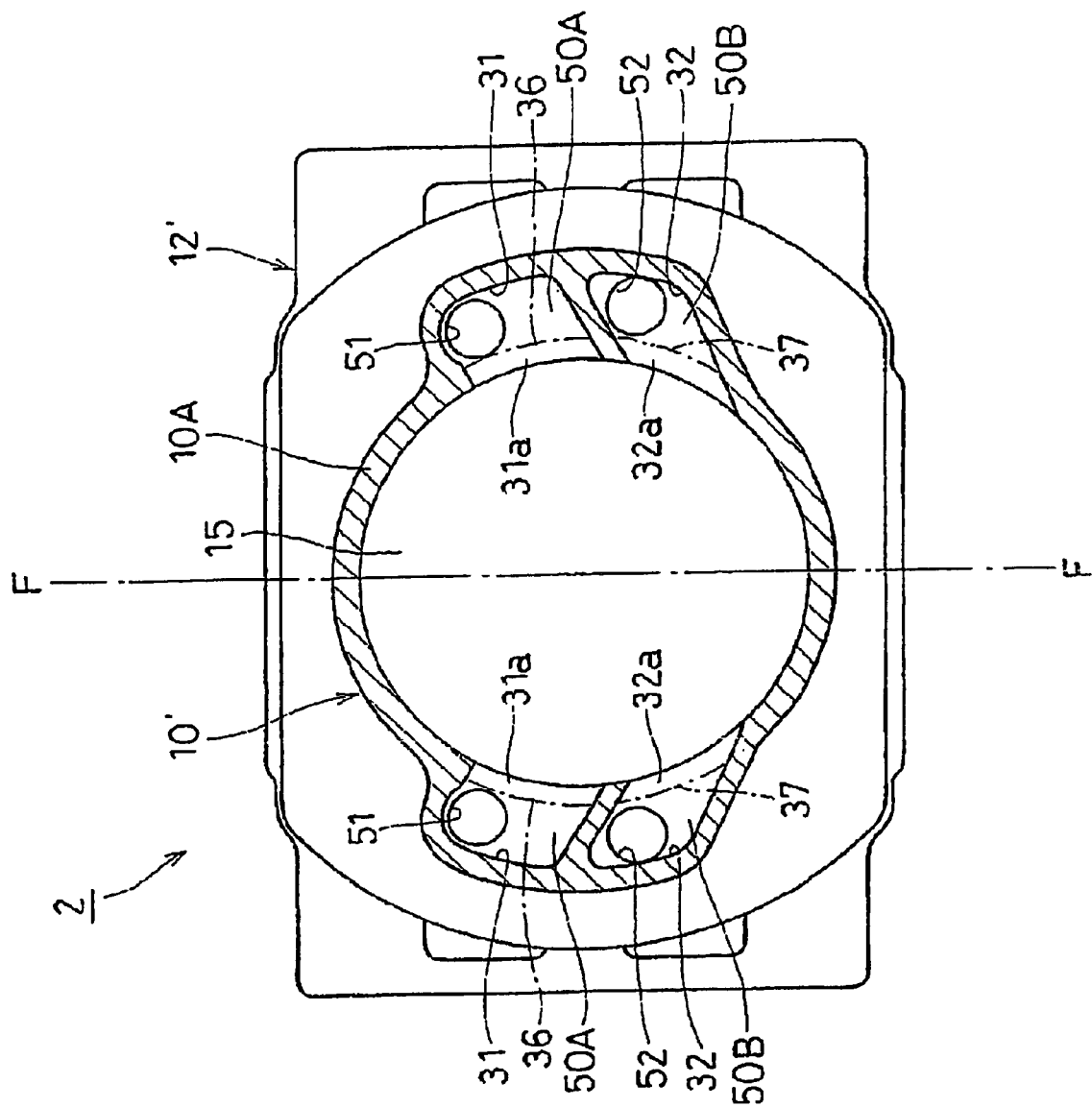
FIG. 7 is a cross-sectional view taken along the line VII—VII in FIG. 6.

In a second embodiment, as shown in FIGS. 6 and 7, the portions or functional parts that correspond with the portions or functional parts of the above-described first embodiment are identified by the same reference numerals and are not further described below. The main differences between the first and second embodiments will be mainly explained in the following.

In the two-stroke cycle internal combustion engine 2 according to the second embodiment, the cylinder portion 10A and the upper crankcase 12A are integrated into a single cylinder case 10'. A lower crankcase part 12B is tightly coupled to the underside of the cylinder case 10', so that the crankcase 18 is defined by a crankcase 12' consisting of the upper crankcase 12A and the lower crankcase 12B. An intake port 33' provided with a reed valve (not shown) is formed at a bottom portion of the crank chamber 18.

Although each scavenging passageway 31 and 32 is provided with a short inner wall 36 which is disposed below each of the scavenging outlet ports 31a and 32a, the portion below the short inner wall 36 (the upstream side of the short inner wall 36) is open, and hence the scavenging passageways 31 and 32 are called a half-wall type. Therefore, in addition to the scavenging outlet ports 31a and 32a, each open portion located below the short inner wall 36 is also designed to be opened and closed by a skirt portion 20a of the piston 20.

In the second embodiment, pairs of partition walls 50A and 50B, each provided with throttling holes 51 and 52 having a smaller cross-sectional area than that of the scavenging passageways 31 and 32, are disposed in the vicinity of the scavenging inlet ports 31b and 32b of the scavenging passageways 31 and 32. The second embodiment operates in the same manner as the first embodiment. As in the first embodiment, the throttling holes 51 and 52 provided in the vicinity of the scavenging inlet ports 31b and 32b of the scavenging passageways 31 and 32, cause a significant difference in pressure to be generated between the crank chamber 18 and the downstream side of the throttling holes 51 and 52 of the scavenging passageways 31 and 32, thereby enabling the air-fuel mixture to be ejected as a high-velocity jet from the throttling holes 51 and 52 and to flow downstream therefrom. The effects described above of enhanced pressure and flow rate of the scavenging gas and the generation of a swirl-like turbulent flow in the scavenging gas discharged from the scavenging passageways into the cylinder actuating chamber are attained with the second embodiment. Accordingly, the atomization of fuel can be promoted, the scavenging efficiency (trapping efficiency) can be improved, and at the same time, the combustion efficiency can be improved. As a result, a predetermined power with a smaller quantity of fuel, a reduction of the noxious components in the exhaust gas, in particular the total HC, and a reduction in the fuel consumption are obtained. Most of the lubricant oil is caused to remain in the crank chamber 18 due to the blocking effect by the step portion.

Although exemplary embodiments of the present invention have been described above and shown in the drawings, it should be understood that the present invention is not limited to the embodiments, but can be varied without departing from the spirit and scope of the invention set forth in the accompanying claims.

The present invention provides a two-stroke cycle internal combustion engine, which emits reduced amounts of noxious components, such as HC, with the exhaust gas, does not require a considerable modification in the structure of the engine or a substantial increase in manufacturing cost, and reduces the incidence of operating difficulties due to excess oil entering the combustion actuating chamber from the scavenging passageways.

What is claimed is:

1. A two-stroke internal combustion engine, comprising a crank chamber located below a piston and a combustion actuating chamber located above a piston; at least one pair of scavenging passageways communicating the crank chamber with the combustion actuating chamber, the scavenging passageways of the at least one pair being disposed symmetrically with respect to a plane that bisects an exhaust port so as to form a Schnürle-type scavenging system, each passageway of the at least one pair of scavenging passageways being fixedly throttled at a location proximate to a scavenging inlet port thereof.

2. The two-stroke internal combustion engine according to claim 1, wherein the combustion actuating chamber is defined by a cylinder member, the crank chamber is defined by a crankcase member connected to an underside of the cylinder member, a plate-like member is interposed between the cylinder member and the crankcase member, and said plate-like member has a fixed throttling hole having an open area which is smaller than the cross-sectional area of the scavenging passageway at a location immediately adjacent the plate-like member so as to throttle a portion of each of the scavenging passageways which is located close to the scavenging inlet port.

3. The two-stroke internal combustion engine according to claim 2, wherein the position and size of the fixed throttling hole are selected in a manner such as to cause turbulent flow of a gas through the scavenging passageway downstream from the throttling hole.

4. The two-stroke internal combustion engine according to claim 4, wherein a step portion is formed in a region close to the scavenging inlet port of each of the scavenging passageways due to the provision of the fixed throttling hole.

5. The two-stroke internal combustion engine according to claim 3, wherein a scavenging outlet port of each of said at least one pair of scavenging passageways is also fixedly throttled.

6. The two-stroke internal combustion engine according to claim 2, wherein a step portion is formed in a region close to the scavenging inlet port of each of the scavenging passageways due to the provision of the fixed throttling hole.

7. The two-stroke internal combustion engine according to claim 2, wherein a scavenging outlet port of each of said at least one pair of scavenging passageways is also fixedly throttled.

8. The two-stroke internal combustion engine according to claim 1, wherein a partition wall having a fixed throttling hole having an open area which is smaller than the cross-sectional area of the scavenging passageway at a location immediately adjacent the partition wall is disposed close to the scavenging inlet port of each of the scavenging passageways.

9. The two-stroke internal combustion engine according to claim 8, wherein the position and size of the fixed throttling hole are selected in a manner such as to cause turbulent flow of a gas through the scavenging passageway downstream from the throttling hole.

10. The two-stroke internal combustion engine according to claim 9, wherein a step portion is formed in a region close to the scavenging inlet port of each of the scavenging passageways due to the provision of the fixed throttling hole.

11. The two-stroke internal combustion engine according to claim 9, wherein a scavenging outlet port of each of said at least one pair of scavenging passageways is also fixedly throttled.

12. The two-stroke internal combustion engine according to claim 8, wherein a step portion is formed in a region close to the scavenging inlet port of each of the scavenging passageways due to the provision of the fixed throttling hole.

13. The two-stroke internal combustion engine according to claim 8, wherein a scavenging outlet port of each of said at least one pair of scavenging passageways is also fixedly throttled.

14. The two-stroke internal combustion engine according to claim 1, wherein a scavenging outlet port of each of said at least one pair of scavenging passageways is also fixedly throttled.

* * * * *

UNITED STATES PATENT AND TRADEMARK OFFICE
CERTIFICATE OF CORRECTION

PATENT NO.    : 6,513,465 B2                                          Page 1 of 1
DATED         : February 4, 2003
INVENTOR(S)   : Fukuoka et al.

It is certified that error appears in the above-identified patent and that said Letters Patent is hereby corrected as shown below:

Column 10,
Line 14, "claim 4," should read -- claim 2, --
Line 22, "claim 2," should read -- claim 4, --

Signed and Sealed this

Twelfth Day of August, 2003

JAMES E. ROGAN
*Director of the United States Patent and Trademark Office*